United States Patent [19]

Gonzalez et al.

[11] Patent Number: 5,285,995
[45] Date of Patent: Feb. 15, 1994

[54] OPTICAL TABLE ACTIVE LEVELING AND VIBRATION CANCELLATION SYSTEM

[75] Inventors: Walter Gonzalez, Rancho Palos Verdes, Calif.; John A. Gniady, Albuquerque, N. Mex.

[73] Assignee: Aura Systems, Inc., El Segundo, Calif.

[21] Appl. No.: 884,428

[22] Filed: May 14, 1992

[51] Int. Cl.$^5$ .......................................... F16M 13/00
[52] U.S. Cl. .................................. 248/550; 248/562; 248/636
[58] Field of Search ............. 248/550, 559, 638, 562, 248/636; 267/136, 140.1; 52/167 R, 167 DF, ; 188/378, 267

[56] References Cited

U.S. PATENT DOCUMENTS

| | | | |
|---|---|---|---|
| 3,917,201 | 11/1975 | Roll | 248/550 |
| 4,351,515 | 9/1982 | Yoshida | 188/267 X |
| 4,405,101 | 9/1983 | Carlson et al. | 244/17.27 |
| 4,477,045 | 10/1984 | Karasawa | 248/550 X |
| 4,595,166 | 6/1986 | Kurokawa | 248/559 |
| 4,600,863 | 7/1986 | Chaplin et al. | 318/114 |
| 4,699,348 | 10/1987 | Freudenberg | 267/140.1 |
| 4,710,656 | 12/1987 | Studer | 310/51 |
| 4,757,980 | 7/1988 | Schubert | 248/550 X |
| 4,821,205 | 4/1989 | Schuttew | 248/550 X |
| 4,848,525 | 7/1989 | Jacot | 188/378 |
| 4,850,261 | 7/1989 | Greene | 91/362 |
| 4,869,474 | 9/1989 | Best | 267/136 |
| 4,964,246 | 10/1990 | Kobori | 52/167 R X |
| 4,999,534 | 3/1991 | Adrianos | 310/90.5 |
| 5,042,784 | 8/1991 | Murai | 267/136 |
| 5,060,519 | 10/1991 | Chojitani | 248/550 X |
| 5,071,108 | 12/1991 | Houghton | 267/136 |
| 5,135,251 | 8/1992 | Wormann | 267/136 X |
| 5,180,958 | 1/1993 | Choshitani | 248/550 X |

*Primary Examiner*—J. Franklin Foss
*Attorney, Agent, or Firm*—Anthony T. Cascio; Lisa A. Clifford

[57] ABSTRACT

An optical table active leveling and vibration cancellation system is disclosed. The system includes an optical table with three active isolation devices connected to the optical table, and one sole pneumatic device, such that the table is supported on all four corners. Each of the isolation devices includes a pneumatic suspension device and an electromagnetic suspension device. The pneumatic suspension device includes a pressurized load chamber, a gimballed piston received in the pressurized load chamber and coupled to the walls of the pressurized load chamber by a thin walled diaphragm, and a support rod extending from the optical table to the floor level. The electromagnetic bearing suspension device includes a magnetic bearing rotor having two planar surfaces and a peripheral surface, and two magnetic bearing stators, the stators each defining a central aperture and each stator being in a spaced apart relationship from each of the rotor planar surfaces. The rotor is secured to the support rod. Each of the stators includes an annular coil of wire. The electromagnetic suspension system may also include four radial electromagnets spaced around the peripheral surface of the rotor. The radial electromagnets also include an annular coil of wire. The system also includes three proximity sensors mounted under the optical table to detect motion of the table in relation to the floor or another fixed reference, and generate a signal in response to the motion. The system also includes three accelerometers mounted underneath the optical table in a triangle. The accelerometers measure vibration of the table in relation to inertial space and generate a signal in response to the movement. A controller receives the signals from the sensors and accelerometers, and generates a second signal, used to activate the pneumatic and electromagnetic bearing suspension devices to provide active leveling and vibration cancellation of the optical table.

32 Claims, 4 Drawing Sheets

FIG. 5
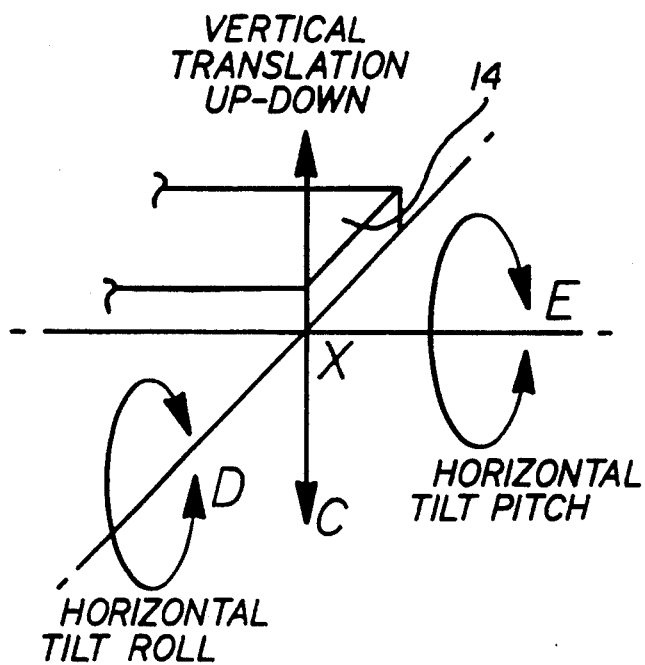
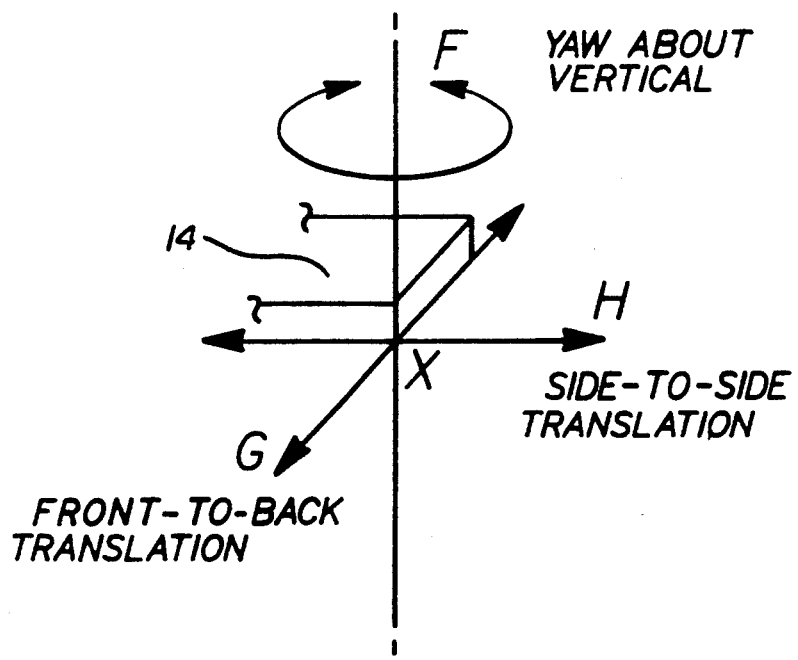
FIG. 6

OPTICAL TABLE ACTIVE LEVELING AND VIBRATION CANCELLATION SYSTEM

FIELD OF THE INVENTION

This invention relates to an active leveling and vibration cancellation system, and more particularly to an active leveling and vibration cancellation system utilizing pneumatic suspension elements in connection with electromagnetic bearings for improving the response time and performance of the system.

BACKGROUND OF THE INVENTION

Optical tables are used to support sensitive instrumentation, and thus require precise leveling and freedom from vibration. In a typical optical table, the optical table top is supported by a suspension system or table mount. Three types of suspension systems are known in the art, namely rigid mounts, pneumatic self-leveling mounts, and elastomeric or pneumatic mounts augmented by very expensive electromagnetic suspension systems.

The first mentioned suspension systems, rigid mounts, although the least expensive, are only suitable for applications where leveling is required, but not vibration isolation. The third mentioned suspension systems, elastomeric or pneumatic suspension systems augmented by expensive electromagnetic suspension systems, are very expensive, and are tailored to the specific needs of a small segment of the active vibration cancellation market. Therefore, the most commonly used suspension systems are the pneumatic self-leveling suspension system.

The pneumatic self-leveling suspension systems typically comprise sensors, pneumatic controls, and structural supports. Each of the vibration isolators in the system act as air springs in that they utilize the compressibility of air contained in a chamber, a sealing element, and a piston to produce the characteristics of a low frequency spring. Thus the pneumatic self-leveling system can accommodate varying loads without major deflections by varying the air pressure in the air chamber.

However, one problem with the pneumatic self-leveling suspension systems is that the systems are incapable of isolating the table from disturbances either generated directly on the table, or otherwise directly impacting the table. For example, rapid load shifts on the table may cause large direct disturbances, such that the table is no longer level. As another example, rotating or moving components on the optical table top will cause the table to respond more than a comparable table placed on rigid mounts. More specifically, the small disturbances on the table may cause the table to vibrate in unison with the disturbances, while the table appears to remain level. Moreover, if not properly designed, the system itself may generate a significant amount of vibration as a result of the contacting forces on the table by mechanical lever arms, or allow the passage of vibrations by the hysteresis of the thin rubber skins used as rolling diaphragms in the system.

Attempts have been made to improve the pneumatic suspension systems. For example, efforts have been made to reduce the effect of changes in the static load on the systems, thus creating zero deflection pneumatic suspensions. The zero deflection pneumatic suspensions make small adjustments to the pneumatic flexibility of the suspensions. The changes in flexibility are made by adjusting the pressure in the load bearing. The pressure adjustments are continued until the suspended entity to the position and/or orientation it occupied prior to the change in the static suspension load. The problem however, with such known types of the zero deflection devices is caused by their slow response. The slowness of the response to changes in static load renders the systems ineffective for many applications.

Efforts have also been made to reduce the effect of the dynamic forces on the suspended entities. Systems have thus been developed using transducers to ascertain the characteristics of the disturbance forces, wide bandwidth analog or high-speed digital techniques to determine cancellation forces proportional to the additive inverses of the dynamic forces, and transducers again to impart the cancellation forces on the suspended entities. However, several problems existed with the transducers used in these known systems. For one, the transducers impart the cancellation forces on the suspended entities at points different than the points of suspension, reducing the effectiveness of the system. Secondly, the cancellation forces created by the system are too small in comparison to the forces needed to minimize the suspended entity's response to sudden dynamic forces created by movement of components connected to the suspended entity.

Therefore, a need exists for an optical table vibration cancellation and active leveling system that provides a quick response to changes in static and dynamic load. Also, a need exists for an optical table vibration cancellation and active leveling system that provides sufficient forces at the points of suspension to minimize the effect of sudden forces exerted on the optical table.

SUMMARY OF THE INVENTION

One object of the present invention is to provide an optical table active leveling and vibration cancellation system that provides a quick response time for active leveling and vibration cancellation.

Another object of the present invention is to provide an optical table active leveling and vibration cancellation system that imparts cancellation forces at the suspended entity's various points of suspension.

A further object of the present invention is to provide an optical table active leveling and vibration cancellation system that is inexpensive to manufacture and install.

Another object of the present invention is to provide an optical table active leveling and vibration cancellation system that is easily installed on existing optical tables.

A still further object of the present invention is to provide an optical table active leveling and vibration cancellation system that includes the advantages provided by pneumatic isolators.

Another object of the present invention is to provide an optical table active leveling and vibration cancellation system that provides for control along six degrees of freedom.

Yet another object of the present invention is to provide an optical table active leveling and vibration cancellation system that maintains the optical table level during rapid load shifts.

A further object of the present invention is to provide a optical table active leveling system that eliminates the resonant peak characteristics of lightly damped pneumatic isolators.

These and other objects of the present invention are achieved through an optical table active leveling and vibration cancellation system comprising an optical table having two surfaces, a sensor for detecting motion of the table and generating a first signal in response to the motion, at least one active isolation device connected to one of the the optical table surfaces, and a controller for receiving the first signal from the sensor and generating a second signal in response to the first signal, wherein the second signal is used to activate the active isolation device to provide active leveling of the optical table.

Each of the isolation devices comprises a pneumatic suspension device and an electromagnetic suspension device. The pneumatic suspension device further comprises a pressurized load chamber, a gimballed piston received in the pressurized load chamber and coupled to the walls of the pressurized load chamber by a thin walled diaphragm, and a support rod extending from the optical table to a pivot point in the pressurized chamber. The electromagnetic bearing suspension device further comprises a magnetic bearing rotor having two substantially planar surfaces and a periphery, and two magnetic bearing stators each being in a spaced apart relationship from each of the rotor surfaces. The rotor is attached to the support rod, and each of the stators defines a central aperture. Each of the stators also includes an annular wire coil. The electromagnetic suspension device is preferably coupled to the pneumatic suspension device in parallel.

The electromagnetic suspension system may also include a magnetic radial bearing comprising four radial electromagnets substantially spaced apart around the peripheral surface of the rotor, and at least one accelerometer for detecting horizontal vibration of the table and providing a horizontal vibration signal to the controller in response to horizontal vibration of the table. The second signal is generated by the controller also in response to the horizontal vibration signal.

These and other objects of the present invention will now become apparent from a review of the drawings and the following description of the preferred embodiment.

BRIEF DESCRIPTION OF THE DRAWINGS

FIG. 5 is a pictorial representation of the actively controlled axes of the first embodiment of the electromagnetic orientation of the isolator assembly shown in FIG. 3;

FIG. 6 is pictorial representation of the actively controlled axes of the second embodiment of the electromagnetic orientation of the isolator assembly shown in FIG. 4.

DETAILED DESCRIPTION

Figure 1:
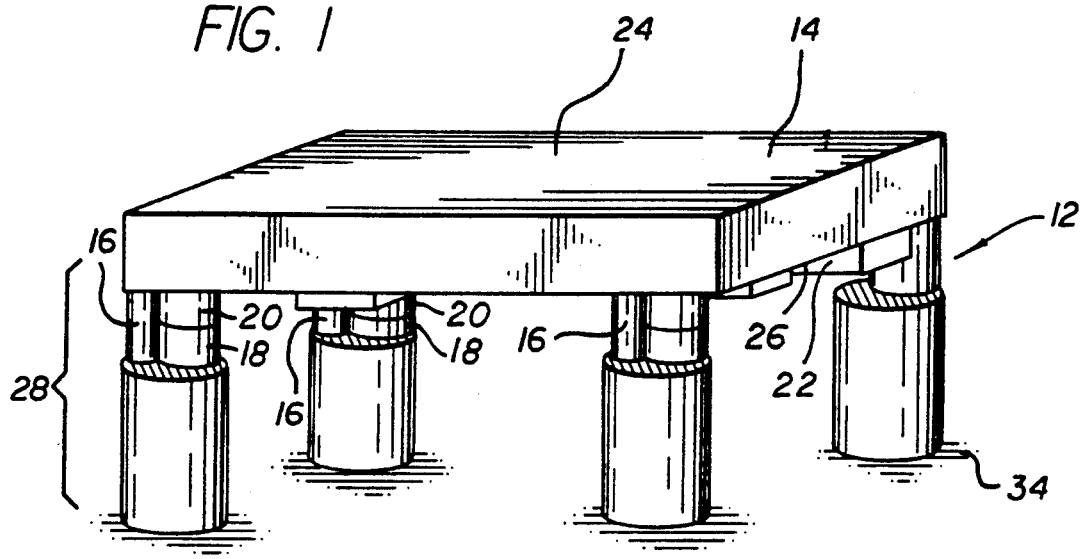
FIG. 1 is a perspective view of an optical table active leveling and vibration cancellation system of the present invention.
Figure 7:
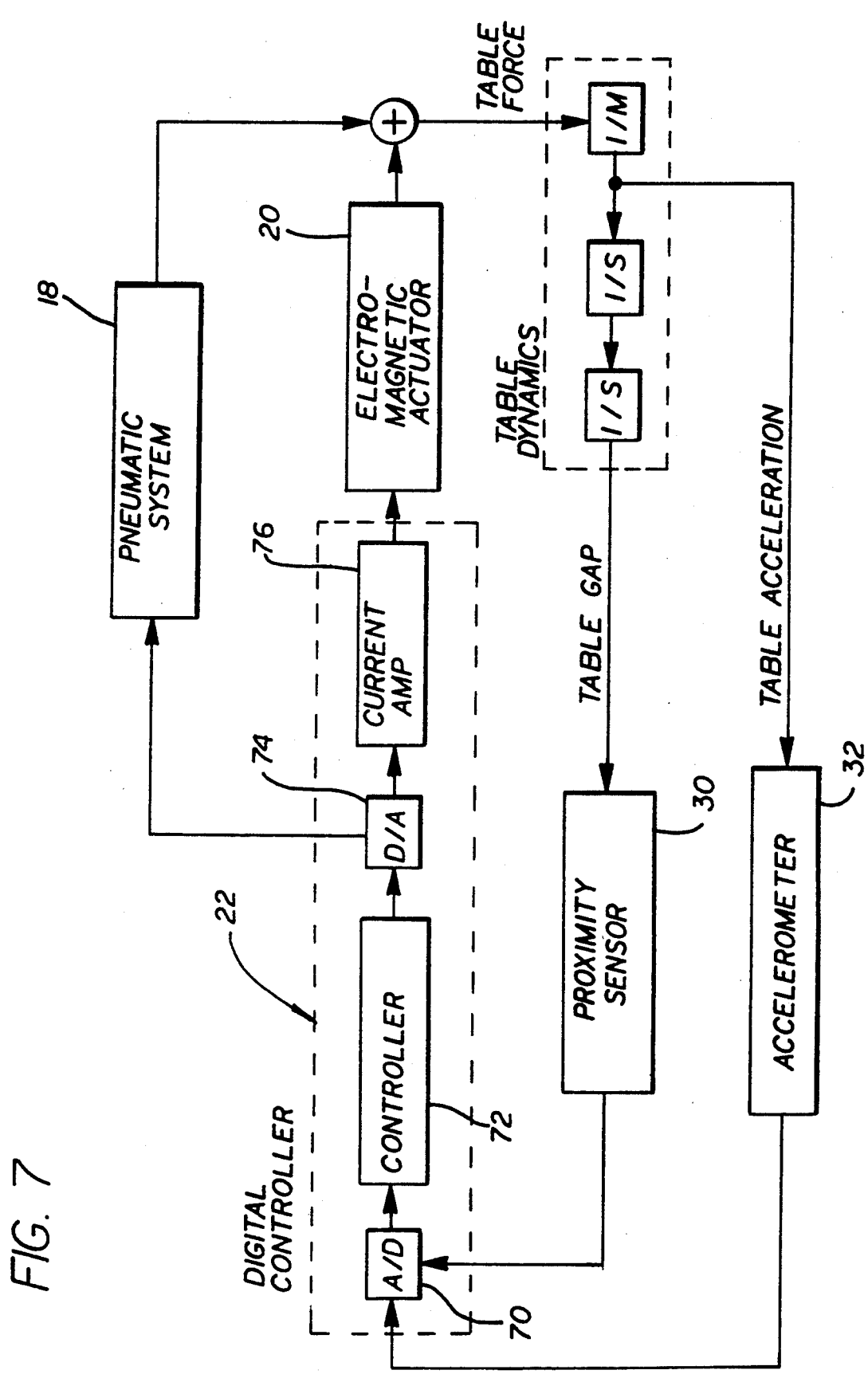
FIG. 7 is a block diagram of the electronics system of one embodiment of the present invention.

Referring now to FIG. 1, one embodiment of an optical table active leveling and vibration cancellation system 12 of the present invention is shown. In the embodiment shown, the system 12 includes an optical table 14, three sensor pairs 16, four pneumatic suspension devices 18, four electromagnetic suspension devices 20, and a digital controller 22. In the embodiment shown, the optical table 14 has an upper surface 24 and a lower surface 26. The sensor pairs 16, pneumatic suspension devices 18, and electromagnetic suspension devices 20 are all mounted on the lower surface 26 of the optical table 14. One of the electromagnetic suspension devices 20 and a corresponding one of the pneumatic suspension devices 18 combine to form an isolator assembly 28. It is to be noted that the pneumatic and electromagnetic suspension devices are not required to be mechanically interconnected to form an isolator assembly. Instead a pneumatic suspension device and an electromagnetic suspension device may be coupled in that both directly affect the optical table or other supported entity, as best shown in FIG. 7.

In FIG. 1, one of the isolator assemblies 28 is located at each of three corners of the optical table 14, and the fourth corner is solely a pneumatic device 18. Therefore, the table 14 is supported at all four corners. Each of the isolator assemblies 28 is also coupled to the sensor pairs 16 and the digital controller 22, as described later in this specification. However, the system may utilize various combinations of pneumatic suspension devices and electromagnetic devices. For example, four pneumatic and four electromagnetic suspension devices may be utilized.

Each of the sensor pairs 16 may be comprised of at least one proximity sensor 30 and an accelerometer 32. The proximity sensor 30 detects movement of the table in relation to the floor surface 34 or another fixed reference. The accelerometer 32 detects movement of the table in relation to inertial space. The sensor pairs 16 are preferably mounted on the lower surface 26 of the optical table 14. A second proximity sensor may be mounted to the pneumatic suspension device outer wall, which extends orthogonal to the floor surface, in order to sense movement of the table along an axis parallel to the floor. The sensor pairs, may comprise other types of sensing devices that detect motion of the table in relation to a fixed reference or inertial space.

Figure 2:
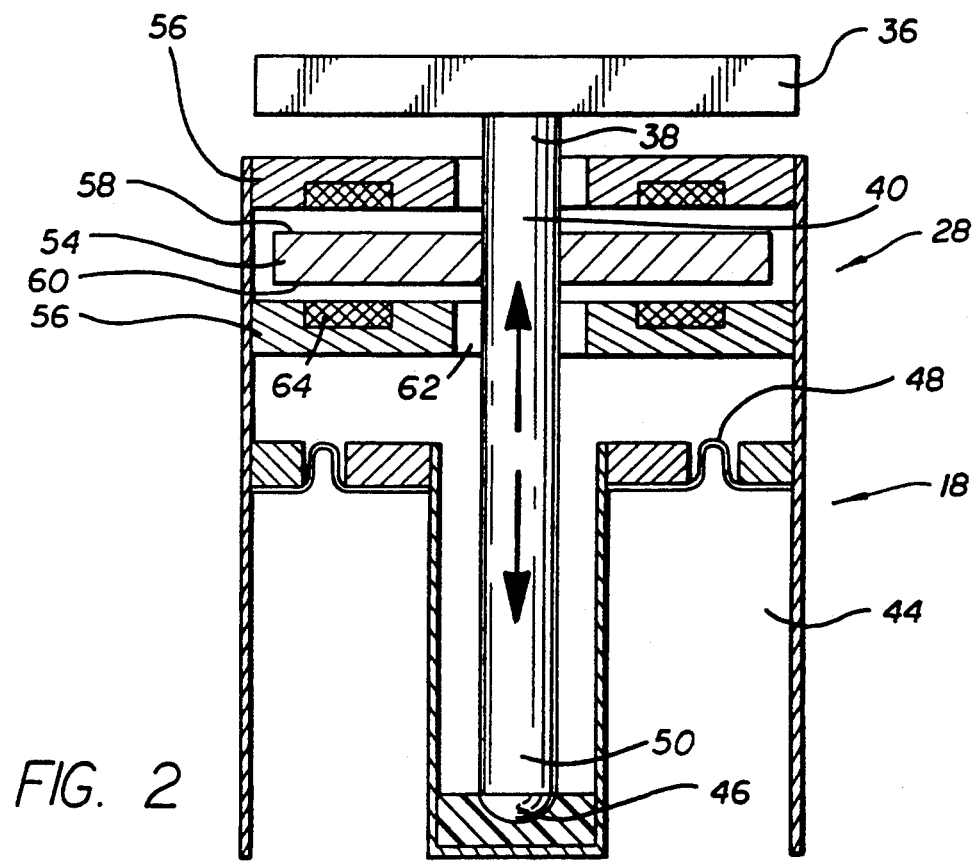
FIG. 2 is a cross-sectional view of one embodiment of an isolator assembly of the present invention.

Referring now to FIG. 2, a first embodiment of one of the isolator assemblies 28 used in the optical table active leveling and vibration cancellation system 12 is shown in detail. The isolator assembly 28 shown comprises a support plate 36, the electromagnetic suspension device 20, and the corresponding pneumatic suspension device 18. In the embodiment shown, the support plate 36 is attached to an upper end 38 of a support rod 40 which extends through the pneumatic and electromagnetic suspension devices 18, 20. The support plate 36 is attached to the optical table lower surface 26 and used to support the optical table 14. The electromagnetic suspension device 20 is located below the support plate 36, and the pneumatic suspension device 18 below the electromagnetic suspension device 20. Thus, in the embodiment shown, the electromagnetic device is in direct physical contact with both the pneumatic suspension device and the optical table. It should be noted however, that this orientation is not required for use of the invention. For example, the electromagnetic suspension device 20 may be oriented vertically below the pneumatic suspension device 18 and the support plate 36, within the pneumatic suspension device 18, or horizontally spaced from and substantially parallel to the pneumatic suspension device 18.

Still referring to FIG. 2, the pneumatic suspension device 18 is similar to several suspension systems known in the art. By way of example, a Technical Manufacturing Company's Gimbal Piston isolator may be used. The pneumatic suspension device 18 shown comprises a the support rod 40, a piston 42, a pressurized load chamber 44, a soft flexure 46, and a thin-walled rolling diaphragm 48,. The support rod 40 is received within the gimballed piston 42, such that a lower end 50 of the support rod 40 is fixed in the soft flexure 46. The upper end 38 of the support rod 40 includes the support plate 36. The pressurized load chamber 44 surrounds the gimballed piston 42, with the thin walled diaphragm 48 connecting the piston 42 to the wall of the pressurized chamber 44.

The pneumatic suspension device 18 operates such that horizontally directed forces activate the piston 42 in a gimbal-like fashion, as known in the art. The piston 42 and diaphragm 48 respond to the horizontal forces by translating the horizontal motion into vertical motion. The piston 42 is also protected against overtravel in the vertical direction.

Still referring to FIG. 2, the electromagnetic suspension device 20 is described. The electromagnetic suspension device 20 shown in FIG. 2 comprises a magnetic bearing rotor 54, and two magnetic bearing stators 56. The magnetic bearing rotor 54 is securely attached to the support rod 40, and is substantially planar with an upper surface 58 and a lower surface 60. The magnetic bearing stators 56 each define a central aperture 62. Each of the stators 56 is disposed in a spaced apart relationship from each of the surfaces 58, 60 of the rotor 54. An annular coil of wire 64 is shown in each of the stators 56. It should be noted that instead of the magnetic stators, a voice coil, or another type of device controlled by Lorentz' law may be used to provide the thrust electromagnetic force.

The integration of the electromagnetic bearing suspension devices 20 with the pneumatic suspension devices 18 allows the isolator assembly 28 to have substantially similar dimensions to the previously used isolation device which only the incorporated the pneumatic suspension device. As a result, the new isolator assemblies 28 may easily replace the previously used pneumatic suspension isolators without requiring alterations to the optical table 14.

Figure 3:
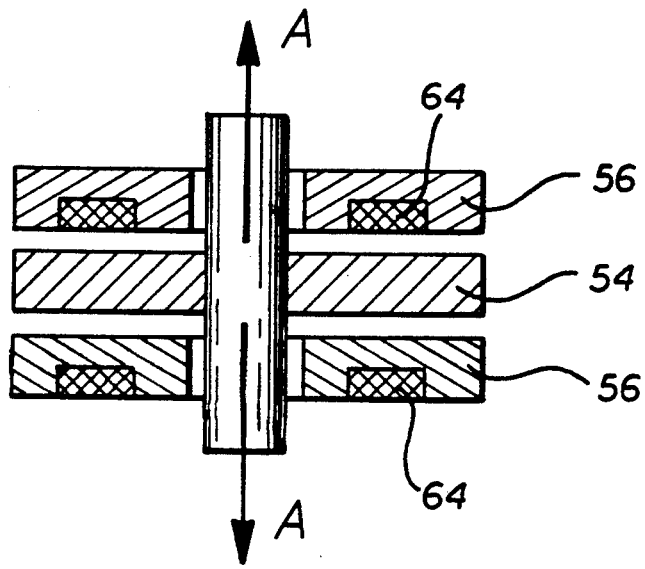
FIG. 3 is a first embodiment of the electromagnetic orientation of the isolator assembly as used for a thrust electromagnetic bearing.
Figure 4:
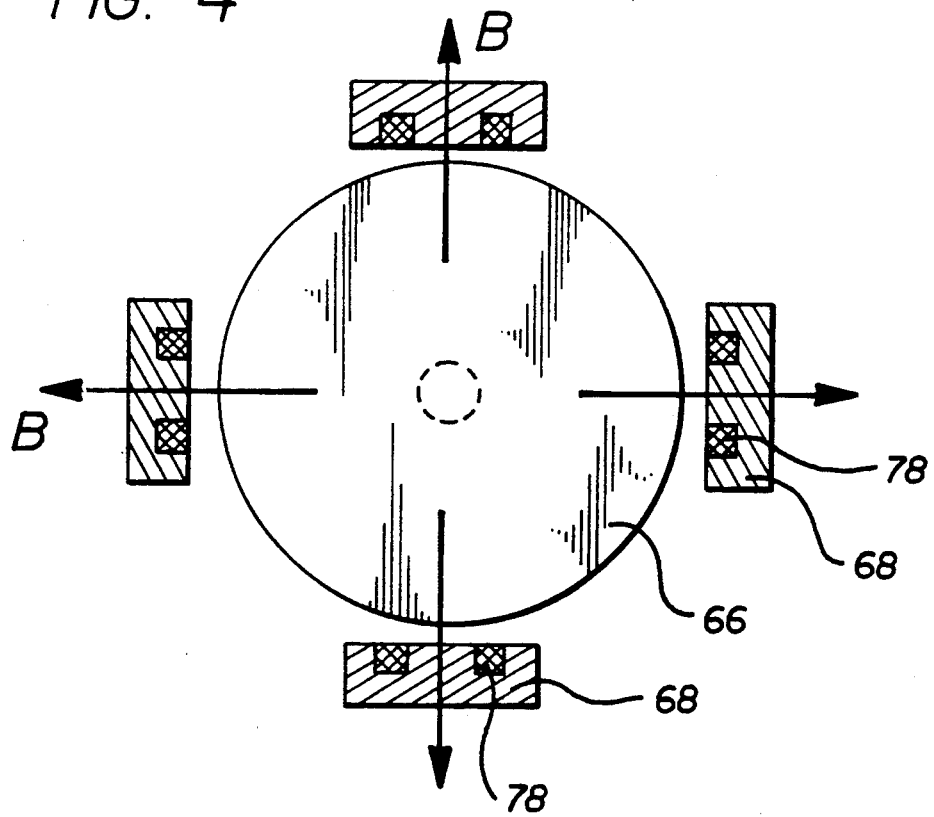
FIG. 4 is a second embodiment of the electromagnetic orientation of the isolator assembly as used for a radial electromagnetic bearing.

Referring now to FIGS. 3 and 4, the first and a second embodiment of the electromagnetic suspension device 20 for the isolator assembly 28 are shown. The first embodiment, shown in FIG. 3 is similar to the embodiment shown in FIG. 2. As explained in more detail below, the first embodiment provides an electromagnetic force in a thrust direction, indicated by arrow A in FIG. 3, that extends in the same direction as the support rod 40. The second embodiment, shown in FIG. 4, is comprised of an electromagnetic rotor 66, and four radial electromagnets 68. The electromagnetic rotor 66 is securely attached to the support rod 40. As shown in FIG. 4, the rotor 66 is preferably circular in cross-section, however, the rotor may also be substantially square having rounded corners. One of each of the four radial electromagnets 68 is disposed in a spaced relationship from the peripheral surface of the rotor 66.

In the embodiment shown, the radial electromagnets 68 are spaced around the peripheral surface of the rotor 66. As an alternative embodiment, two or three radial electromagnets 68 may be used, with the two electromagnets 68 disposed in a spaced apart relationship from the periphery of the rotor 66. As yet another alternative embodiment of the invention, three electromagnets may be used. An annular wire coil 78 is shown in each of the radial electromagnets 68. It should be noted that instead of the radial electromagnets, a voice coil or other type of device controlled by Lorentz law may be used to provide the radial electromagnetic force. The attractive force of the radial electromagnets 68 extends radially from the center of the rotor 66, as shown by the arrows B in FIG. 4.

The first and second embodiments of the electromagnetic suspension device 20 may be combined to form a third embodiment of the invention. In the third embodiment, the rotors 54 and 66 are incorporated into a single rotor, however, both the stators 56 and the radial electromagnets 68 are included in the device. The third embodiment provides electromagnetic force in both the thrust and radial direction.

With reference now to FIGS. 5 and 6, the results of using the three different embodiments of the electromagnetic suspension devices 20 is described. As shown in FIG. 5, the thrust electromagnetic configuration shown in FIG. 3 responds to static load changes and dynamic disturbances along three separate degrees-of-freedom in the optical table 14. Point X on FIG. 5 may represent a corner of the optical table 14. The three degrees-of-freedom to which the thrust electromagnetic bearing responds are (a) vertical translation up-down, represented by arrow C, (b) horizontal tilt roll, represented by arrow D, and (c) horizontal tilt pitch, represented by arrow E. As shown in FIG. 6, the radial electromagnetic configuration, shown in FIG. 4, also responds to static load changes and dynamic disturbances along three separate degrees-of-freedom to which the radial electromagnetic configuration responds are (a) yaw about the vertical axis, represented by arrow F, (b) front-to-back translation, represented by arrow G, and (c) side to side translation, represented by arrow H. The third embodiment, by utilizing both the thrust and radial electromagnet bearings, allows for control along all six degrees-of-freedom, or three lines of action. Therefore, different embodiments of the invention are available depending on which degrees-of-freedom require control.

Referring now to FIG. 7, a block diagram of the electronics schematics for each of the isolators assemblies 28 is shown. The optical table 14 is coupled to both the proximity sensor 30 and the accelerometer 32. The proximity sensors 30 and accelerometers 32 are also coupled to the digital controller 22. The digital controller 22 comprises an analog to digital converter 70, a controller card 72, a digital to analog converter 74, and a current amplifier 76. The analog signals received from both the sensors 30 and the accelerometers 32 are converted to digital signals by the analog to digital converter 70. The digital signals are read by the controller card 72, which produces a second digital signal, which is then converted back to a second analog signal by the digital to analog converter 74. The second analog signal is sent to the pneumatic suspension device 18, and, via the current amplifier 76, to the electromagnetic suspension device 20 in order to provide the active leveling and vibration cancellation of the suspended entity.

The digital controller 22 may also contain power supplies. Depending on the embodiment of the invention used, the digital controller box 22 may further include sensor signal conditioners, and PWM drivers. The digital controller box 22 is preferably mounted under the optical table 14, and in one embodiment is preferably approximately 19×15×6 inches in dimension.

As previously mentioned, the accelerometers 32 detect vibration of the table 14 in relation to inertial space. The accelerometers 32 serve the function of providing vibration feedback signals to the vibration cancellation system. Preferably, the system 12 utilizes high-sensitivity accelerometers, followed by a low-noise monolithic instrumentation amplifier, in order to keep the cost of the system low. The accelerometers 32 also preferably have a noise spectra of approximately 16 to 30 decibels less than floor vibration spectra in a typical environment. As a result, the typical vibration spectra will drop by at least approximately 13 to 27 decibels when the vibration cancellation loop is activated. The resonant frequency of the accelerometers 32 when mounted is approximately 550 hertz. Alternatively, the system may use geophones or seismometers to detect the vibrations in the table.

The proximity sensors 30 are mounted in a spaced apart relationship from the optical table lower surface 26 and are used to detect movement of the table 14 in relation to the floor or another fixed reference, for example, fixed reference that is perpendicular to floor level. The sensors 30 serve the functions of providing DC low frequency system reference, and relative table position feedback signals to the pneumatic suspension device and active leveling system. The sensors 30 preferably have a dynamic range of approximately 100 mils to 25 uinch (72 dB). The sensors 30 are also preferably low noise with a high selectivity filter circuit, and high bandwidth. As an alternative, the system may incorporate interferometers for sensing movement of the table in relation to a fixed reference.

The digital to analog converter 74 and current amplifier 76 are utilized as the last two components to drive the electromagnetic suspension devices 20. The converter 74 converts the analog signals from the sensors 30, 32 to digital signals for use by the digital controller card 72. The converter 74 preferably has a 12 bit D/A range of 72 dB. The amplifier 76 is preferably a low noise linear current amplifier with approximately a 110 dB range.

The table acceleration dynamic range is approximately 325 mg to 1 ug. The accelerometers 32 preferably operate in the lower portion of approximately 1 ug to 4 mg. The proximity sensors 30 preferably operate in the higher range. Therefore, the full dynamic range is covered by two A/D channels driven by the accelerometers 32 and the proximity sensors 30. The digital controller 22 may also include a mode switch (not shown) to switch between the active leveling function and the vibration cancellation function. Alternatively, the system may be designed such that the controller continues from one function into the second function without operator intervention.

In order to demonstrate the effectiveness of the isolators 28 of the present invention, the performance of one embodiment of the invention in response to a 100 pound force dropped at the optical table corner is described. In this example, the peak electromagnetic force of 60 LBF, provided by the electromagnetic suspension devices 20, is achieved almost instantaneously, at less than 0.02 seconds. The electromagnetic force then drops off such that it is approximately 25 LBF at 0.75 seconds, and approximately 1 LBF at 4 seconds. In comparison, at less than 0.02 seconds, the pneumatic force, provided by the pneumatic suspension devices 18, is approximately 1 LBF. The pneumatic force then rises such that at approximately 0.75 seconds, the pneumatic force equals the electromagnetic force of 25 LBF, and at 4 seconds, the pneumatic force is approximately 49 LBF. This example demonstrates the advantages of the use of the electromagnetic suspension system in conjunction with the pneumatic suspension system. It is shown that the electromagnetic force responds almost instantaneously to the force drop. The pneumatic system is capable of taking over the reducing steady state forces on produced by the electromagnets so as to reduce power dissipation on the electromagnets. Therefore, the electromagnetic suspension system provides for a very quick response time, while the pneumatic suspension system provides for the extended force requirements of the system.

Having thus described exemplary embodiments of the present invention, it should be noted by those skilled in the art that the within disclosures are exemplary only and that various other alternatives, adaptations, and modifications may be made within the scope of the invention. Thus, by way of example, but not of limitation, the optical table may actually comprise a suspended vertical surface as compared to a horizontal surface. Moreover, the isolators devices or active leveling and vibration cancellation system may be used to softly suspended or supported entities other than optical tables. Also, the system may be modified so as to include a laser system which is utilized to align tables in different locations, creating a net effect of electronically, as opposed to mechanically joining the tables, with each of the tables having its own active suspension system. Accordingly, it is to be understood that the present invention is not limited to the precise construction as shown in the drawings and described hereinabove.

We claim:

1. An optical table active positioning system for a softly supported entity comprising:
    at least one pneumatic support device, said pneumatic support device providing pneumatic force to the supported entity along a pneumatic support axis;
    at least one electromagnetic force device, said electromagnetic force device being coupled to a corresponding pneumatic support device and providing electromagnetic force to the supported entity along an electromagnetic force axis, said electromagnetic force device further comprising a substantially planar bearing rotor and a first and a second electromagnet stator, said first stator being in a spaced apart relationship axially above said rotor and said second stator being in a spaced apart relationship axially below said rotor;
    at least one first sensor coupled to said pneumatic support device and said electromagnetic force device, and detecting a motion of the supported entity along a first sensor axis in relation to a first fixed reference, wherein said first sensor generates a first signal in response to the motion; and
    a controller for receiving the first signal from the sensor, and generating a control signal in response to the first signal, wherein the control signal is used to activate the pneumatic and electromagnetic devices to provide active positioning of the supported entity.

2. An active positioning system for a softly supported entity in accordance with claim 1 wherein said pneumatic support axis and said electromagnetic force axis are coaxial.

3. An active positioning system for a softly supported entity in accordance with claim 1 wherein said pneumatic support axis and said electromagnetic force axis are substantially parallel to each other.

4. An active positioning system for a softly supported entity in accordance with claim 1 wherein said pneumatic support axis, said electromagnetic force axis, and said first sensor axis are coaxial.

5. An active positioning system for a softly supported entity in accordance with claim 1 wherein said pneumatic support axis, said electromagnetic force axis, and said first sensor axis are substantially parallel to each other.

6. An active positioning system for a softly supported entity in accordance with claim 1 wherein said electromagnetic force device is a double-acting electromagnetic thrust bearing.

7. An active positioning system for a softly supported entity in accordance with claim 1 wherein said electromagnetic force device is in direct physical contact with the softly supported entity.

8. An active positioning system for a softly supported entity in accordance with claim 1 wherein said first sensor is a proximity sensor.

9. An active positioning system for a softly supported entity in accordance with claim 1 wherein said first sensor is an interferometer.

10. An active positioning system in accordance with claim 1 further comprising four pneumatic devices and four electromagnetic force devices, with each of said four electromagnetic devices being coupled to a different one of said pneumatic devices, and further wherein said four electromagnetic devices provide force along four different axes.

11. An active positioning system in accordance with claim 1 further comprising four pneumatic devices and three electromagnetic force devices, with each of said three electromagnetic devices being coupled to a different one of said pneumatic devices, and further wherein said three electromagnetic devices provide force along three different axes.

12. An active positioning system for a softly supported entity in accordance with claim 1 further comprising:
at least one radial electromagnetic force device, said radial electromagnetic force device providing electromagnetic force to the supported entity in an orthogonal plane, said orthogonal plane being substantially orthogonal to said electromagnetic force axis; and
at least one second sensor coupled to the radial electromagnetic force device and detecting a second motion of the supported entity in the orthogonal plane in relation to a second fixed reference, wherein said second sensor generates a second signal in response to the second motion, said second signal being applied to the controller for generating said control signal.

13. An active positioning system for a softly supported entity in accordance with claim 12 wherein said radial electromagnetic force device is a double-acting electromagnetic radial bearing.

14. A vibration cancellation system for a softly supported entity comprising:
at least one pneumatic support device, said pneumatic support device providing pneumatic force to the supported entity along a pneumatic support axis;
at least one electromagnetic force device, said electromagnetic force device being coupled to a corresponding pneumatic support device and providing electromagnetic force to the supported entity along an electromagnetic force axis, said electromagnetic force device further comprising a substantially planar bearing rotor and a first and a second electromagnet stator, said first stator being in a spaced apart relationship axially above said rotor and said second stator being in a spaced apart relationship axially below said rotor;
at least one first sensor coupled to said pneumatic support device and said electromagnetic force device, for detecting a vibratory motion of the supported entity along a first sensor axis in relation to inertial space, wherein said first sensor generates a first signal in response to the vibratory motion;
a controller for receiving the first signal from the sensor, and generating a control signal in response to the first signal, wherein the control signal is used to activate the pneumatic and electromagnetic devices to provide vibration cancellation of the supported entity.

15. A vibration cancellation system for a softly supported entity in accordance with claim 14 wherein said pneumatic support axis and said electromagnetic force axis are coaxial.

16. A vibration cancellation system for a softly supported entity in accordance with claim 14 wherein said pneumatic support axis and said electromagnetic force axis are substantially parallel to each other.

17. A vibration cancellation system for a softly supported entity in accordance with claim 14 wherein said pneumatic support axis, said electromagnetic force axis, and said first sensor axis are coaxial.

18. A vibration cancellation system for a softly supported entity in accordance with claim 14 wherein said electromagnetic force axis and said first sensor axis are substantially parallel to each other.

19. A vibration cancellation system for a softly supported entity in accordance with claim 14 wherein said electromagnetic force device is a double-acting electromagnetic thrust bearing.

20. A vibration cancellation system for a softly supported entity in accordance with claim 14 wherein said first sensor is an accelerometer.

21. A vibration cancellation system for a softly supported entity in accordance with claim 14 wherein said first sensor is a geophone.

22. A vibration cancellation system for a softly supported entity in accordance with claim 14 wherein said first sensor is a seismometer.

23. A vibration cancellation system for a softly supported entity in accordance with claim 14 further comprising four pneumatic devices and four electromagnetic force devices, with each of said four electromagnetic devices being coupled to a different one of said pneumatic devices, and further wherein said four electromagnetic force devices provide force along four different axes.

24. A vibration cancellation system for a softly supported entity in accordance with claim 14 comprising four pneumatic devices and three electromagnetic force devices, with each of said three electromagnetic devices being coupled to a different one of said pneumatic devices, and further wherein said three electromagnetic force devices provide force along three different axes.

25. A vibration cancellation system for a softly supported entity in accordance with claim 14 further comprising:
at least one radial electromagnetic force device, said radial electromagnetic force device providing electromagnetic force to the supported entity in an orthogonal plane, said orthogonal plane being substantially orthogonal to said electromagnetic force axis; and
at least one second sensor coupled to the radial electromagnetic force device and detecting a second vibratory motion of the supported entity in relation to inertial space in the orthogonal plane, wherein said second sensor generates a second signal in response to the second vibratory motion, said second signal being applied to the controller for generating the control signal.

26. A vibration cancellation system for a softly supported entity in accordance with claim 26 wherein said radial electromagnetic force device is a double-acting electromagnetic radial bearing.

27. A vibration cancellation system for a softly supported entity in accordance with claim 14 further comprising at least one position sensor for detecting a motion of the supported entity in relation to a fixed reference wherein said position sensor generates a position signal in response to the motion, and further wherein said controller receives the position signal and generates the control signal in response to the position signal, thereby also providing active positioning of the entity.

28. A vibration cancellation system for a softly supported entity in accordance with claim 27 wherein said first position sensor is a proximity sensor.

29. A vibration cancellation system for a softly supported entity in accordance with claim 27 wherein said first position sensor is an interferometer.

30. A vibration cancellation system for a softly supported entity in accordance with claim 27.

31. A vibration cancellation system for a softly supported entity in accordance with claim 30 wherein said second position sensor is a proximity sensor.

32. A vibration cancellation system for a softly supported entity in accordance with claim 30 wherein said second position sensor is an interferometer.

* * * * *